Nov. 3, 1936. R. M. HARDGROVE Re. 20,156

CONTROL SYSTEM

Original Filed May 8, 1931 2 Sheets-Sheet 1

INVENTOR.
Ralph M. Hardgrove
BY
Raymond W. Junkins
ATTORNEY.

Nov. 3, 1936. R. M. HARDGROVE Re. 20,156

CONTROL SYSTEM

Original Filed May 8, 1931 2 Sheets-Sheet 2

INVENTOR.
Ralph M. Hardgrove
BY
Raymond W. Jenkins,
ATTORNEY.

Reissued Nov. 3, 1936

Re. 20,156

UNITED STATES PATENT OFFICE 20,156

CONTROL SYSTEM

Ralph M. Hardgrove, Westfield, N. J., assignor to The Babcock & Wilcox Company, New York, N. Y., a corporation of New Jersey Original No. 2,012,934, dated August 27, 1935, Serial No. 536,037, May 8, 1931. Application for reissue August 22, 1936, Serial No. 97,472

10 Claims. (Cl. 83—9)

This invention relates to automatic control systems for pulverizing mills, and more particularly to a control of the quantity and temperature of air which is to provide a carrying means for removing or transporting pulverized material in suspension from the mill.

The quantity of air required to carry the pulverized material in suspension has been found to vary with the type of material, which may be coal, lime, paint pigment or similar substances, and must be sufficient to transport the pulverized material in suspension without allowing it to drift or settle out in the pipe leading from the pulverizer. It is undesirable, however, to pass through the mill an excess of air over that required. Such an excess requires additional fan or blower capacity at its source as well as additional equipment and expense in separating the pulverized material from the carrier air at the point of usage or storage. If coal to be used as fuel is the material pulverized, then an excess of air may introduce into the furnace a greater amount or percentage of air than is desired for efficient combustion.

I have found it desirable to control the temperature of the carrier air for such a pulverizing mill so that the material being pulverized will be to a certain extent dried, and as in the case of fuel pulverized for combustion, any heat added to the air going with the coal to the furnace aids in the economy of operation of the furnace. Said temperatures, however, must be limited to those which are safe from an operating standpoint of the various apparatus, and with a consideration of the possibility of spontaneous combustion or volatilizing of the material.

One object of my invention is to provide a system of control for the air supplied to a pulverizer, wherein the rate of flow of the air through the pulverizer will be in desired proportion to the rate of feed of material to be pulverized.

Another object is to so arrange the system that a desirable functional relation may exist between the rate of flow of air and the rate of feed of material to the pulverizer, and with means for manually adjusting or changing the functional relationship.

A further object is to so limit the minimum flow of air that it cannot be decreased below a value wherein is assured the carrying in suspension of the pulverized material.

A still further object is to so control the temperature of the air passed through the pulverizer that the temperature of the mixture of air and pulverized material leaving the pulverizer will be as desired.

Still another object is to provide an automatic control system for combustion in a steam generating boiler combining a regulation of the input of fuel and air for combustion and to so divide the air supply that a part of it is diverted through a fuel pulverizer to provide a carrier of the pulverized fuel to the combustion chamber.

With these and further objects in view, I will now describe certain embodiments of my invention as illustrated in the drawings.

I have chosen to illustrate and describe my invention with reference to fuel pulverizers for providing an element of combustion for a steam generating furnace or furnaces, although it will be apparent from a study of the invention and to those skilled in the art that the invention may be equally applicable to pulverizers of lime, paint pigment or other materials, which for various reasons must be ground or pulverized to a finely divided state and desirably transported by means of air to the point of usage or of storage.

Figures 1, 2:
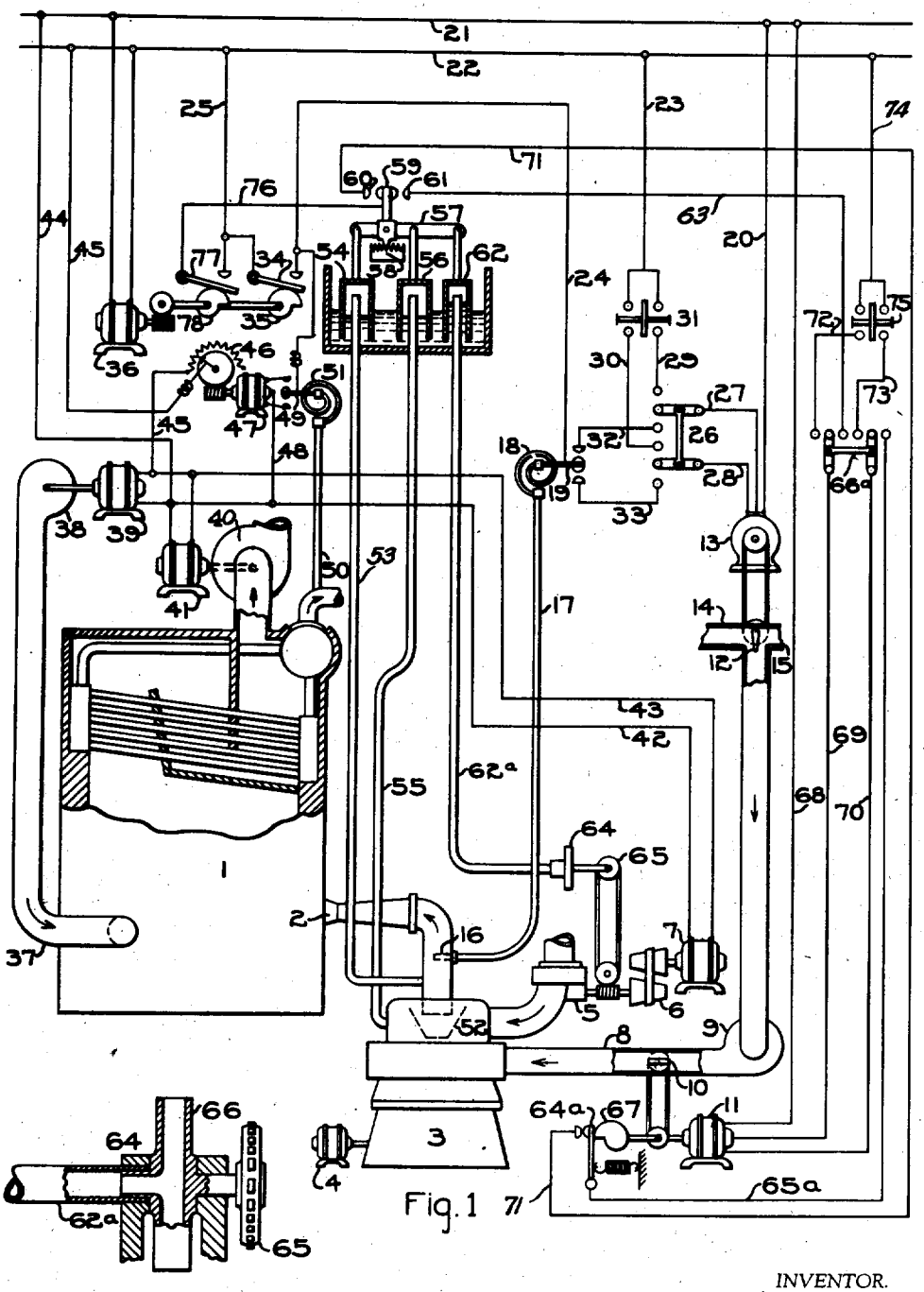
Fig. 1 is a somewhat diagrammatic representation of a steam generating boiler with fuel and air supplying apparatus to which the invention has been applied.
Fig. 2 is a partially sectioned elevation of a pneumatic tachometer.

Referring first to Fig. 1, I have represented generally at 1 a steam generating boiler, to the combustion chamber of which is supplied fuel in pulverized form, carried in suspension in a stream of air, and fed to the combustion chamber through a burner 2. A pulverizing mill 3 for reducing the fuel to a finely divided state in which it can be transported suspended in a stream of air to the boiler, is driven at a constant speed by a motor indicated at 4. Coal to be pulverized is fed to the pulverizer 3 by a feeder 5, driven through a speed adjusting means 6 by an adjustable speed motor 7.

Air to form a carrier for the pulverized fuel and to constitute an element of combustion, is fed to the mill through a conduit 8 under pressure by a fan indicated at 9 driven by a constant speed motor (not shown). I control the quantity of air flowing to the mill through the conduit 8 by the positioning in the conduit of a damper 10 by a reversible means indicated in the drawing at 11 as a reversible electric motor. Air entering the fan 9 may vary in temperature, and such variation is controlled through the positioning of a damper 12 by a reversible motor 13 relative to the conduits 14 and 15 wherein is available relatively hot and relatively cold air respectively.

The temperature of the stream of air carrying the suspended pulverized material to the burner 2 is indicated by a gas-filled thermometer system of which the bulb 16 is located in the path of the stream of air and pulverized material. The bulb is connected by means of a tube 17 with a Bourdon tube 18 having an indicating arm 19 forming the movable element of a contactor for the control or positioning of the reversible motor 13. The motor 13 is connected by the conductor 20 with the main power line 21, and through either the conductor 23 or the conductors 24, 25 to the main power line 22.

In the circuit of the motor 13 is a two-pole, double throw switch 26, one arm of which is connected to the motor by the conductor 27 and the other by the conductor 28. In the position of rest as shown in Fig. 1, the motor is not operating, as the switch 26 is open. The switch is arranged, when moved upwardly, to connect the conductor 27 to a conductor 29 and the conductor 28 to a conductor 30, the conductors 29 and 30 forming branches of the conductor 23 through a selective push button station 31. When the switch 26 is moved downwardly, the conductor 27 is connected to a conductor 32, and the conductor 28 to a conductor 33, the conductors 32 and 33 comprising branches of the conductor 24 through a selective contactor of which the arm 19 is the selective circuit closer. The conductor 24 is further interrupted before joining the main power line 22, by an interrupting contact arm 34 joining the conductor 25.

A positioning of the damper 12 through an operation in one direction or the other of the reversible motor 13 is selectively accomplished by means of the push button station 31 or by the contactor 19, in the one case manually and in the other automatically from variations in temperature at the bulb 16. If the switch 26 is in an upper contacting position, then the motor 13 may be energized in one direction or the other by means of the push button station 31 closing circuit between the conductor 23 and either the conductor 29 or the conductor 30. If the switch 26 is in its downward contacting position, then the push button station 31 is inoperative and energization of the motor 13 may occur only through a closing of circuit between the conductor 24 and the conductor 32 or the conductor 24 and the conductor 33, through a positioning of the contact arm 19 upon a deviation of the temperature of the air and pulverized fuel mixture temperature from a predetermined value. The contactor 19 is effective, however, only periodically as controlled by a closing of the contact arm 34 with the conductor 24 through the periodic rotation of a cam 35 continuously rotated by a motor 36. Thus energization of the motor 13 automatically from temperature deviation, is intermittent or by increments, thereby allowing time for changes in the position of the damper 12 to become effective upon the temperature at the bulb 16 before further changes in the damper position are made, and thus minimize the tendency to overtravel or hunt.

In addition to the air supplied through the conduit 8 and the burner 2 for transporting the pulverized fuel, further air for combustion is supplied the boiler through a conduit 37 by a fan 38 driven by an adjustable speed motor 39. Products of combustion are withdrawn from the furnace by a fan 40 driven by an adjustable speed motor 41.

The fuel feeder motor 7, the air supply motor 39, and the motor for removing the products of combustion 41, are connected in parallel to electrical busses 42 and 43, and are arranged to have their speed of rotation varied simultaneously through a control of the voltage supplied the busses. The bus 42 is fed from the power line 21 through a conductor 44. The bus 43 is fed from the power line 22 through a conductor 45, in which is inserted an adjustable rheostat 46 positioned by a reversible motor 47 connected to the power line 21 through the conductors 48, 42, 44 and to the power line 22 through the conductor 25, said latter circuit controlled by a contactor 49 and periodically interrupted by the interrupting contact arm 34, previously described. The contactor 49 is arranged to close circuit for rotation of the motor 47 in one direction or the other upon a departure from a predetermined value of a factor of the boiler operation. In the present embodiment I have shown the contactor 49 as positioned by variations in steam pressure, effective through the pipe 50 upon a Bourdon tube 51 for positioning the contactor arm 49 in one direction or the other when the steam pressure within the boiler 1 increases or decreases relative to a predetermined desired value.

It will be seen, then, that I have provided a means of supplying fuel and air to the boiler 1 for combustion, depending upon the rate of operation of the boiler, sensitive to variations in a factor of the boiler operation and intermittently effective through the periodic rotation of the cam 35 to minimize the tendency to hunt or overtravel.

I have found that the amount of air supplied for combustion and used in its passage to the combustion chamber as a carrier of the pulverized fuel, should be proportioned to the amount of fuel being supplied, although not necessarily directly proportioned thereto. With this type of apparatus and under certain conditions of operation, a given amount of air, say 100%, will be needed to transport the maximum fuel pulverized by the mill 3, or 100% of fuel, whereas if the boiler is operating at a rate requiring only 50% fuel, then 50% air would be required as a transport medium. Under other conditions of apparatus and operation, when 50% fuel is supplied it might be advisable to have 75% air, and in any event, whenever fuel is being supplied there should be a minimum rate of feed of the air great enough to prevent drifting or settling out of the fuel from the air stream, or prevent the velocity of the stream from decreasing to a point where flame could travel back from the boiler to the mill. Thus it will be seen that the proportion of air to fuel may be desirably different at different rates of operation, and preferably there should be provided manually adjustable means for varying the proportionality or functional relation between the supply of air and of fuel.

To properly regulate the supply of air to the mill 3, it is necessary that an indication be obtained of the rate of flow of the air, and this compared to an indication of the rate of feed of fuel to be pulverized to the mill. I have found that a definite relation exists between the drop in pressure across a portion of the mill 3 and the rate of flow of air and pulverized fuel in suspension through that portion of the mill. In Fig. 1 I have illustrated at 52 the classifying cone of the mill around which the mixture passes from the grinding portion of the mill on its way to the burner 2 and across the restriction of which exists a differential pressure bearing a quadratic relation to the rate of flow of the mixture.

I have illustrated at 53 a pipe leading from the outlet of the cone to the inside of a liquid sealed bell 54 and at 55 a pipe leading from the inlet of the cone to the inside of a liquid sealed bell 56. The bells 54 and 56 are hung from a beam 57, pivoted intermediate the points of suspension of the bells at 58, and arranged upon oscillation across the pivot 58 to engage the contact arm 59 with either of the contacts 60 or 61. The contact arm 59 is adjustably fastened to the beam 57 in a manner such that the moment arm relation between the points of connection of the bells 54, 56 and the fulcrum 58 may be varied.

To balance against the differential pressure effective upon the bells 54 and 56, I have illustrated a liquid sealed bell 62 also suspended from the beam 57 and exerting a variable counterbalancing effect upon the beam. To the underside of the bell 62 is joined a pipe 62a leading from a pneumatic tachometer 64 which is driven in step with the feeder 5 as a measure of the feeder speed and correspondingly, of the rate of feed of material to be pulverized to the mill.

In Fig. 2 is shown in greater detail the pneumatic tachometer 64 wherein the driven sprocket 65 is connected to and rotates an open-ended cross tube 66 journaled in and pressure-sealed to the pipe 62a. Rotation of the sprocket 65 and of the cross tube 66 throws air by centrifugal force out of the ends of the tube 66, thus creating a suction within the pipe 62a effective upon the bell 62 to pull it downwardly and thus effect a counterbalance of the beam 57. The law of such a tachometer has been determined as a quadratic relation between speed of rotation and suction produced, so that this effect may be applied directly as a counterbalance against the similar functional relation of differential pressure between the bells 54 and 56 as an indication of the rate of flow of air through the mill.

By properly selecting the sizes of the bells 54, 56 and 62, as well as adjusting the fulcrum 58 for moment arm relation of the bells, and the relation of speed between the feeder 5 and the pneumatic tachometer 64, the desired direct or functional relation will exist between the rate of flow of air and pulverized fuel across the cone 52 and the rate of feed of material to be pulverized through the feeder 5. Deviation from such desired relation will cause the contact arm 59 to engage either the contact point 60 or 61 to result in an energization of the motor 11 in one direction or the other to correct the rate of flow of air through the mill.

The contact 60 is connected through the conductor 71, the limit switch 64a, and the conductor 65a with one pole of a double pole, double throw switch 66a for selecting between push button or automatic operation of the motor 11. The limit switch 64a is positioned by a cam 67 moved in step with the damper 10 to break circuit between the conductors 71, 65a when a predetermined minimum damper position is reached and to prevent a further closing of the damper.

The motor 11 is joined to the power line 21 directly by a conductor 68 and indirectly by the conductors 69 and 70 which lead to the two arms of the selective switch 66a. The contact 61 is joined to one pole of the switch 66a by a conductor 63. The main power line 22 is led to the switch 66a by a conductor 74 branching through the conductors 72 and 73 and the selective push button station 75.

If the selective switch 66a is positioned toward the right in Fig. 1, circuit will be closed through the conductors 69 and 63 to the contact 61, and through the conductors 70, 65a, limit switch 64a and conductor 71 to the contact 60. Thus the motor 11, one side of which is directly connected with the power line 21 through the conductor 68, is connected for selective contact by the arm 59, which through a conductor 76, interrupting contact arm 77 and conductor 25 is joined to the main power line 22, periodically upon rotation of the cam 78 which is driven in parallel with the cam 35 by the motor 36.

When the switch 66a is thrown to its contacting position to the left in Fig. 1, then the motor is connected through the push button station 75 and disconnected from the contact points 60 and 61, to the end that the push button 75 may be operated to connect the power line 22 through the conductor 72 to the conductor 69, or through the conductor 73 to the conductor 70, and rotate the motor 11 in one direction or the other as desired, manually by remote push button control.

In operation, assume for example, that the steam output of the boiler 1 increases and the steam pressure decreases. The decrease in steam pressure will result in a tendency toward a counter-clockwise rotation of the contact arm 49 of the Bourdon tube 51, to cause engagement with one of the terminal contacts of the motor 47 for a rotation thereof. The motor 47, however, will be energized only intermittently upon closure of circuit through the contact arm 34 by rotation of the cam 35. Thus, so long as the contact arm 49 engages one of the terminal contacts of the motor 47, the motor 47 will be operated by increments to vary the adjustment of the rheostat 46 and thereby the speed of the fuel motor 7, the air supply motor 39 and the motor 41 which removes the products of combustion from the boiler. The supply of the elements of combustion to the boiler will be increased, and by increments of duration as determined by the percentage of each revolution of the cam 35 that the contact arm 34 is close circuited, and by the frequency of rotation of the cam 35. The intermittent and incremental adjustments to the speed of the fuel and air feeding motors allows time for change in the rate of feed of air and fuel to be felt at the boiler, as indicated by the steam pressure, and thus minimize the possibility of overtraveling and hunting. Should the load decrease and the pressure rise above the predetermined desirable value, the action of the contactor is the reverse, and the motors 7, 39, and 41 would be decreased in speed, with a corresponding decrease in rate of feed of fuel and air for combustion.

Considering the first condition, namely, an increase in speed of the fuel feeding motor 7 and of the feeder 5, this will result in an increase in speed of rotation of the pneumatic tachometer 64, a corresponding increase in suction within the bell 62, causing the same to move downward and oscillating the beam 57 to move the contact arm 59 toward the right and close circuit with the contact point 61, which in the event that the switch 66a is in the automatic position (toward the right), will result in a rotation of the motor 11 in a direction to open the damper 10 and increase the feed of air through the conduit 8 to the mill 3, the operation of the motor 11 being by increments as determined by the rotation of the cam 78. An increase in the rate of flow of air through the conduit 8 to the mill will result in an increased velocity past the cone 52, an increased differential in pressure between the pipes 55 and 53 and correspondingly below the bells 56 and 54, which means that the upward push of the bell 56 will have greater preponderance over the upward push of the bell 54 than previously, and this effect will increase until it counterbalances the effect of the downward pull of the bell 62 and causes the contact arm 59 to seek its neutral non-contacting position wherein the relation between the pressure differential across the cone 52 and suction produced by the pneumatic tachometer 64 is in equilibrium.

In the arrangement illustrated in Fig. 1, the pressure transmitted through the pipes 53 and 55 will be higher than atmosphere, but it is understood that it is immaterial whether the pressures effective upon the bells 54 and 56 are greater or less than atmosphere, as it is relative pressures or pressure differential that produce the result.

Regardless of rate of operation of the boiler 1, or changes in such rate and corresponding changes in the rate of supply of material and carrier air to the mill 3, the heat content of the air supplied through the conduit 8 is adjusted to maintain a desired temperature of the mixture of air and pulverized fuel in suspension leading to the burner 2. Assume the selective switch 26 to be in the automatic position (downward), and that for some reason the temperature of the mixture passing the bulb 16 has lowered below that which is desirable, then the Bourdon tube 18 will tend to close up in a clockwise direction, moving the contact arm 19 downward, closing circuit with the conductor 33 and energizing the motor 13 in a direction to position the damper 12 to open passage from the conduit 14 at the expense of passage from the conduit 15 and thereby admit a greater proportion of heated air to cooler air to the conduit 8. Conversely, should the temperature at the bulb 16 increase over that desired, Bourdon tube 18 will move the contact arm 19 to close circuit with the conductor 32, and result in a rotation of the motor 13 in a direction to cause an admission of a greater proportion of cooler air to warm air, the rotation of the motor 13 being intermittent through periodic rotation of the cam 35.

It will be seen that both in the case of the positioning of the damper 10 and the positioning of the damper 12 for control respectively of the quantity and of the temperature of the air supplied as a carrier of the pulverized material, I have the possibility through the selective switches 26 and 66a of having either automatic control or remote manual push button control of the said dampers.

Figure 3:
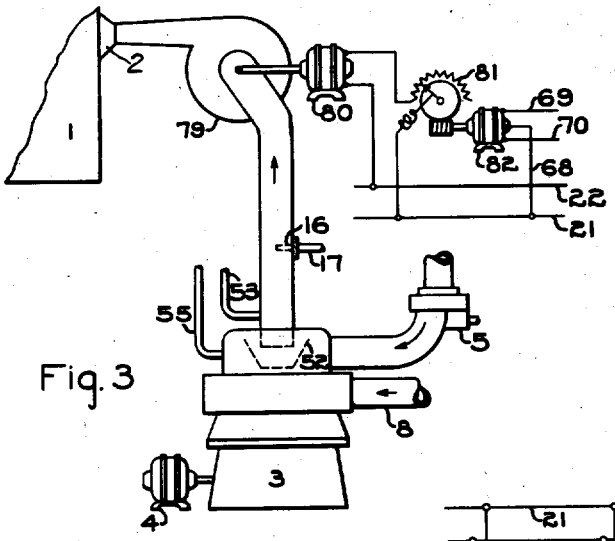
Fig. 3 is a somewhat diagrammatic drawing of a fuel pulverizer and discharge means comprising a modification for adaptation to the system illustrated in Fig. 1.

In Fig. 3 I have illustrated a modification of a fragment of the layout shown in Fig. 1, like parts bearing the same reference numerals. In this modification, air is supplied the mill through the conduit 8 from any desirable source, which may be the atmosphere or may be from a heater or heat-controlled device, but the conrol of the quantity of air supplied the mill 3 is not in the conduit 8 as is the case in Fig. 1. I have shown positioned between the mill 3 and the burner 2 a fan 79 driven by an adjustable speed motor 80, exhausting from the mill 3 air and pulverized fuel carried in suspension by the air. The pressures effective through the pipes 53 and 55 are in this embodiment less than atmospheric. The control of the air flowing through the mill 3 is by speed control of the motor 80 rather than by positioning of a damper in the conduit 8.

To control the speed of the motor 80, I have provided a rheostat 81 positioned by a reversible motor 82 in a manner similar to the positioning of the damper 10 by the reversible motor 11 of Fig. 1.

It will be seen that my invention is equally applicable to pulverized material supplying systems and pulverizing mills operated under a suction as to those operated under a pressure of the air, and whether the air is forced through the mill or drawn through the mill by an exhauster.

Figure 4:
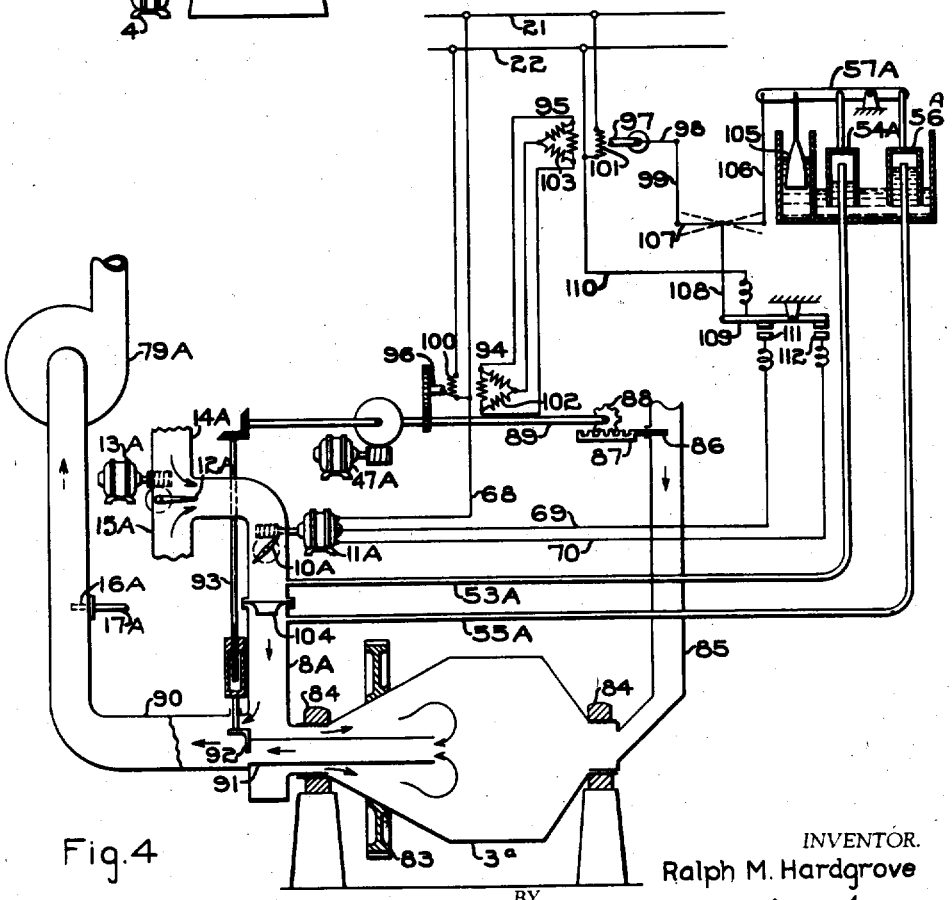
Fig. 4 is a somewhat diagrammatic illustration of a fuel pulverizer system forming a further modification of the complete control system illustrated in Fig. 1.

In Fig. 4 I have shown somewhat diagrammatically a further modification illustrated as a fragment of the layout of Fig. 1 depicting a different type of mill, namely one commonly known as a horizontal ball mill, as compared to the vertical ball mills of Fig. 1 and Fig. 3, and further, with somewhat different arrangements of control, but to accomplish a similar purpose in volume and temperature control of the air passing through the mill as a carrier for the pulverized material.

The mill 3a is rotated through the gear 83 by any suitable means (not shown) and is trunnion-mounted at the bearings 84 in a manner such that the fuel admission pipe 85 enters at one end, and the air admission conduit 8A enters at the other end, without objectionable leakage of air or pulverized material and without interfering with the free rotation of the mill 3a.

The rate of admission to the mill of coal to be pulverized is controlled by the positioning across the admission duct 85 of a gate 86 through movement of a rack 87 by a gear 88 fastened to a shaft 89. An exhauster motor 79A pulls the mixture of air and pulverized material in suspension from the mill through a conduit 90 so formed to join the conduit 8A and an inner conduit 91 which lies within the conduit 8A and extends to the interior of the mill 3a. Air passing through the conduit 8A may pass through the mill 3a around the conduit extension 91, or may bypass the mill directly to the conduit 90, depending upon the positioning (vertically in the drawing) of a gate 92. All of the air entering the mill 3a around the inner conduit 91 returns through the conduit 91 with the fuel carried in suspension and passes to the exhauster 79A through the conduit 90 along with any air which has been bypassed directly from the conduit 8A to the conduit 90, depending upon the positioning of the gate 92. Thus it will be seen that if the gate 92 is in its uppermost position, none of the air from the conduit 8A is bypassed directly to the conduit 90, but all of said air passes to the mill and to the conduit 90 through the inner conduit 91; whereas if the gate 92 is positioned to its lowermost position on the drawing, then all of the air passing through the conduit 8A is bypassed directly to the conduit 90, and not having passed through the mill 3a, does not carry any pulverized material from the mill 3a to the conduit 90.

The gate 92 is controlled in vertical position by the rotation of a screw-threaded rod 93 in turn rotated from the shaft 89. The shaft 89 is turned when desired through an energization of the motor 47A which corresponds to the motor 47 of Fig. 1. The position of the gate 86, indicative of the rate of feed of fuel to the mill, and of the gate 92, both controlled by the position of the shaft 89, is in this embodiment desirably remotely indicated for comparing with the rate of flow of air to the mill, by means of self-synchronous or selsyn motors, generally indicated at 94 and 95. I designate at 94 a transmitting generator and at 95 a receiving motor. The transmitting generator is operated at a suitable ratio with respect to the gate 86 by means of spur gears connecting the generator shaft 96 to the shaft 89. Rotor shaft 97 of the receiving motor positions angularity an arm 98 from which is freely suspended a link 99.

The generator and motor are similar in construction, having single phase field windings, 100 and 101 on the rotors, and three-phase armature windings 102 and 103 on the stators. The field windings are energized from a suitable source of alternating current supply 21 and 22, while like points of the armature windings are interconnected.

The operation of systems of this general character for the transmission of angular movement is well known in the art. Voltages are induced in the three-phase stator windings of the generator and motor by the single phase field windings on the associated rotors. When the rotors of the generator and motor are in the same angular position with respect to their stators, the induced voltages in the armature windings are equal and opposite, and consequently no current is set up in the armature windings. If the rotor of the generator is turned and held in its new position, the voltages no longer counterbalance, whereby equalizing currents are caused to flow in the armature windings. The equalizing currents exert a torque on the rotor of the motor, causing it to take up a position corresponding to the position of the generator rotor. Angular movement imparted to generator 94 is therefore reproduced by receiving motor 95. When the shaft 89 is rotated, a proportional rotation occurs in angular movement of the arm 98, remotely located in the present embodiment at a point adjacent a measuring means of the rate of flow of air to the mill.

In the present embodiment I measure the air passing to the mill 3a by means of a flow nozzle 104 or other similar pressure differential producing device, at opposite sides of which to the conduit 8A are joined the pressure pipes 53A and 55A, leading respectively to the underside of the liquid sealed bells 54A and 56A suspended from the pivoted beam 57A in a manner similar to that illustrated in Fig. 1. I desire, however, to translate the quadratic relation of, pressure differential relative to flow, through the flow nozzle 104 to increments of flow for the positioning of the beam 57A, so I suspend from the beam 57A in addition to the bells 54A and 56A, a variable counterbalancing means comprising a displacer 105 submerged in varying amount in a liquid such as mercury and effecting a variable counterbalancing of the differential pressure applied to the beam 57A. From the beam 57A a link 106 is freely suspended, and is positioned vertically directly in proportion to the rate of flow of air supplied to the mill 3a.

Freely suspended from the lowermost ends of the vertical links 99 and 106 is a floating bar 107, from a point intermediate the ends of which is hung a link 108 joining a contact bar 109 fulcrumed intermediate its ends. The conductor 110 joins the contact bar 109 to the power line 22, and the contact bar 109 is arranged, upon oscillation around its fulcrum, to engage and close circuit with either the contact 111 or the contact 112, depending upon the direction of positioning from a non-contacting neutral position. Closing the circuit with the contact 111 or with the contact 112 results in an operation of the motor 11A in one direction or the other for a positioning of the damper 10A to control the total supply of air to the mill.

It will be apparent to those skilled in the art, that should the rate of feed of fuel and air to the pulverizer increase or decrease in step with each other, then the vertically suspended links 99 and 106 may be arranged to move oppositely and equally to the end that the center point of the floating bar 107 will be unchanged in position, and the vertical link 108 will not be moved vertically, and no rotation of the motor 11A will result, for the relationship between air and fuel is as desired.

If, however, the rate of fuel feed is increased through movement of the motor 47A, then the position of the shaft 89 being remotely transmitted to cause an angular positioning of the arm 98 will move vertically the link 99 irrespective of the fact that the link 106 has not been so moved, and the result will be a vertical positioning of the link 108 and a closing of either the contact 111 or the contact 112 to result in an operation of the motor 11A, varying the rate of flow of air through the conduit 8A. This change in the rate of flow of air effective across the flow nozzle 104 will change the pressure differential effective upon the bells 54A and 56A, with the result that the vertical link 106 will be positioned vertically and in opposite direction to that of the link 99. Thus when the air flow has been changed in amount in desired proportion to the rate of fuel feed, the contact arm 109 will be brought back to its original non-contacting position and further change in the position of the damper 10A will cease.

It will be seen that the modifications illustrated in Fig. 3 and Fig. 4 form modifications of a part only of the complete system illustrated in Fig. 1, and may be substituted in the complete system illustrated in Fig. 1 for the parts of which they are modifications. To save unnecessary duplication, howe /er, Fig. 3 and Fig. 4 have been drawn to illustrate only the parts so modified rather than duplicating the complete system in each of drawings Fig. 3 and Fig. 4.

The control of heating of the air through proportioning heated air to cool air by positioning the damper 12A relative to the ducts 14A and 15A by the motor 13A from an indication of temperature in the conduit 17A by the bulb 16A corresponds to similar arrangement of Fig. 1.

Other modifications and types of apparatus may equally well be used, and my invention is applicable not only to the pulverization of coal used as a fuel in a boiler furnace, but for other materials wherever it is desirable to transport the pulverized material from the mill by means of carrier air and control the proportion of the carrier air to the rate of feed of material to the mill, or control the temperature of the carrier air to maintain a desired temperature of the mixture of carrier air and material transported in suspension in pulverized form.

Having now described certain preferred embodiments of my invention, I desire it to be understood that I am not limited thereby, other than as claimed in view of prior art.

What I claim as new and desire to secure by Letters Patent of the United States, is:—

1. In a pulverizing apparatus, a pulverizing mill including means for feeding thereinto material to be pulverized, means for supplying air to the mill to carry therefrom the pulverized material in suspension, means for bypassing directly to the discharge of the mill part or all of the air supplied, means for simultaneously varying the proportion of air so bypassed and the rate of feed of material to be pulverized, measuring means of the air supplied, means for varying the quantity of air supplied, regulating means for said last-named means, and control means responsive to said third-named means and said measuring means for positioning said regulating means when other than a predetermined relation exists between the rate of supply of air and material to be pulverized.

2. In a pulverizing apparatus, a pulverizing mill including means for feeding thereinto material to be pulverized, means for supplying air to the mill to carry therefrom the pulverized material in suspension, valve means associated with said air supplying means for varying the quantity of air supplied, control means for effecting movement of said valve means comprising a reversible electric motor, a contact means for energizing said motor, measuring means of the air supplied, a transmitting generator positioned responsive to the rate of feed of material to be pulverized, a receiving motor for indicating the rate of feed of material to be pulverized, alternating current field and armature windings for said motor and generator, electrical connections for equalizing currents between said armature windings whereby the motor is caused to be in synchronism with the generator, said receiving motor and said measuring means coacting to position said contact means for operation of the reversible electric motor in one direction or the other when the rate of flow of air supplied and rate of feed of material to be pulverized deviates from desired proportionality.

3. In a pulverizing apparatus, a pulverizing mill including means for feeding thereinto material to be pulverized, means for supplying air to the mill to carry therefrom the pulverized material in suspension, valve means associated with said air supplying means for varying the quantity of air supplied, control means for effecting movement of said valve means comprising a reversible electric motor, a contact means for energizing said motor, measuring means of the air supplied, a transmitting generator positioned responsive to the rate of feed of material to be pulverized, a receiving motor for indicating the rate of feed of material to be pulverized, alternating current field windings for said motor and generator, a source of alternating current supply for said field windings, polyphase armature windings for said motor and generator, electrical connections between said armature windings whereby the motor is caused to be in synchronism with the generator, said receiving motor and said measuring means coacting to position said contact means for operation of the reversible electric motor in one direction or the other when the rate of flow of air supplied and the rate of feed of material to be pulverized deviates from desired proportionality, means whereby said proportionality may be different at different rates of operation of the pulverizing apparatus, and manually adjustable means for varying said proportionality.

4. In a pulverizing apparatus, a pulverizing mill including means for feeding thereinto material to be pulverized, means for supplying air to the mill to provide a carrier for the pulverized material, means comprising a fan for withdrawing the air and pulverized material in suspension from the mill, control means for varying the speed of the fan, and automatic means responsive to the rate of feed of material to the mill for positioning said control means.

5. In a pulverizing apparatus, a pulverizing mill including means for feeding thereinto material to be pulverized, means for supplying air to the mill to carry therefrom the pulverized material in suspension, control means for said air supplying means, means continually determining the rate at which the material is supplied to the pulverizer, automatic means responsive to said last-named means for positioning said control means, means limiting the said automatic means whereby the rate of supply of air cannot be reduced below a predetermined minimum, manually operated means for making inoperative said limiting means whereby the limitation of reduction in the rate of flow of air is removed, and manually operated means whereby the rate of flow of air may be decreased below said predetermined minimum following the removal of said limitation.

6. In a fuel preparing and handling system, the combination of a pulverizing mill including means for feeding thereinto fuel to be pulverized, means for supplying air to the mill to provide a carrier for the pulverized fuel, a discharge conduit for the pulverizer and through which the stream of carrier air and pulverized fuel in suspension is passed, control means for said air supplying means, automatic means jointly responsive to the rate of feed of fuel to the mill and to the rate of flow of air through the mill for positioning said control means, and thermostatically controlled means for maintaining a predetermined temperature of the stream of carrier air and pulverized fuel in suspension passing through the conduit.

7. In a fuel preparing and handling system, the combination of a pulverizing mill including means for feeding thereinto fuel to be pulverized, means for supplying air to the mill to provide a carrier for the pulverized fuel, a discharge conduit for the pulverizer and through which the air and pulverized fuel in suspension is passed, means for bypassing a portion of the air directly to the conduit, and control means for simultaneously varying the rate of supply of fuel to the pulverizer and proportionally varying said bypassing of air.

8. In a fuel preparing and handling system, the combination of a pulverizing mill including means for feeding thereinto fuel to be pulverized, means for supplying air to the mill to provide a carrier for the pulverized fuel, a discharge conduit for the pulverizer and through which the air and pulverized fuel in suspension is passed, means for bypassing a portion of the air directly to the conduit, control means for simultaneously varying the rate of supply of fuel to the pulverizer and proportionally varying said bypassing of air, and automatic means responsive to the rate of supply of fuel to the pulverizer for controlling the total supply of air.

9. In a fuel preparing and handling system, the combination of a pulverizing mill including means for feeding thereinto fuel to be pulverized, means for supplying air to the mill to provide a carrier for the pulverized fuel, a discharge conduit for the pulverizer and through which the air and pulverized fuel in suspension is passed, means for bypassing a portion of the air directly to the conduit, control means for simultaneously varying the rate of supply of fuel to the pulverizer and proportionally varying said bypassing of air, and thermostatic means responsive to the temperature in the conduit for controlling the temperature of the air supply.

10. In a pulverizing apparatus, a pulverizing mill including means for feeding thereto material to be pulverized, means for supplying air to the mill to provide a carrier for the pulverized material, control means for said last-named means, an air flow meter, and a meter of the rate of supply of material to the pulverizer, said meters conjointly effective in positioning said control means.

RALPH M. HARDGROVE.